(12) United States Patent
Eschenbeck et al.

(10) Patent No.: US 11,536,359 B2
(45) Date of Patent: Dec. 27, 2022

(54) ARRANGEMENT OF A ROTOR POSITION SENSOR

(71) Applicant: ZF Friedrichshafen AG, Friedrichshafen (DE)

(72) Inventors: Linus Eschenbeck, Wangen (DE); Thomas Riedisser, Sigmarszell (DE); Carl Schilling, Weingarten (DE); Andreas Geiger, Markdorf (DE); Gerald Viernekes, Hassfurt (DE); Matthias Weidner, Wasserlosen (DE); Monika Rößner, Donnersdorf (DE); Christopher Allnoch, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 336 days.

(21) Appl. No.: 16/659,779

(22) Filed: Oct. 22, 2019

(65) Prior Publication Data
US 2020/0124157 A1    Apr. 23, 2020

(30) Foreign Application Priority Data
Oct. 23, 2018 (DE) ..................... 10 2018 218 118.7

(51) Int. Cl.
*F16H 57/02* (2012.01)
*G01D 5/12* (2006.01)
(Continued)

(52) U.S. Cl.
CPC ......... *F16H 57/02* (2013.01); *F16H 57/0441* (2013.01); *G01D 5/12* (2013.01);
(Continued)

(58) Field of Classification Search
CPC .. F16H 57/02; F16H 57/0441; F16H 57/0427; F16H 45/02; F16H 2057/02026;
(Continued)

(56) References Cited

U.S. PATENT DOCUMENTS

| 6,340,339 B1 | 1/2002 | Tabata et al. |
| 10,926,622 B2 | 2/2021 | Reimnitz |

(Continued)

FOREIGN PATENT DOCUMENTS

| DE | 19942445 A1 | 5/2000 | |
| DE | 112011100114 T5 | 12/2012 | |
| WO | WO 2018/113840 A1 | 6/2018 | |
| WO | WO 2018103873 A1 * | 6/2018 | ............ F16H 41/24 |

OTHER PUBLICATIONS

Sumida Development of Eddy-Current Rotor Position Sensor, JSAE Paper No. 20144103, May 23, 2014 (Year: 2014).*

(Continued)

*Primary Examiner* — Vinh Luong
(74) *Attorney, Agent, or Firm* — Dority & Manning, P.A.

(57) ABSTRACT

An arrangement of at least one sensor track-scanning rotor position sensor (1, 1 A) of an electric machine (EM) in a hybrid transmission housing (2) that includes a torque converter (3) and a housing-affixed oil supply plate arrangement is provided. The rotor position sensor (1, 1 A) is attached on an oil-supply-plate side, and a sensor ring (8), as a sensor track, is attached on a converter side. A hybrid transmission housing (2) including the arrangement is also provided.

12 Claims, 6 Drawing Sheets

(51) Int. Cl.
 *F16H 57/04* (2010.01)
 *F16H 45/02* (2006.01)
 *F16H 57/021* (2012.01)

(52) U.S. Cl.
 CPC .......... *F16H 45/02* (2013.01); *F16H 57/0427* (2013.01); *F16H 2045/0215* (2013.01); *F16H 2057/0216* (2013.01); *F16H 2057/02026* (2013.01); *F16H 2057/02034* (2013.01); *F16H 2057/02043* (2013.01)

(58) Field of Classification Search
 CPC ........... F16H 41/24; G01D 5/12; F16D 21/00; F16D 13/72; F16D 13/385
 See application file for complete search history.

(56) References Cited

U.S. PATENT DOCUMENTS

| | | | |
|---|---|---|---|
| 2011/0095634 A1* | 4/2011 | Lamke | H02K 7/006 310/91 |
| 2012/0319514 A1 | 12/2012 | Iwase et al. | |
| 2018/0097430 A1* | 4/2018 | Crecelius | H02K 7/006 |
| 2020/0014283 A1* | 1/2020 | Payne | F16D 13/683 |
| 2020/0040976 A1* | 2/2020 | Steiner | F16D 25/123 |
| 2021/0172505 A1* | 6/2021 | Li | F16H 45/02 |

OTHER PUBLICATIONS

Define target, Google Search, Jan. 4, 2022 (Year: 2022).*
German Search Report DE 10 2018 218 118.7, dated May 21, 2021. (12 pages).

* cited by examiner

ARRANGEMENT OF A ROTOR POSITION SENSOR

CROSS-REFERENCE TO RELATED APPLICATION

The present application is related and has right of priority to German Patent Application No. 10 2018 218 118.7 filed on Oct. 23, 2018, the entirety of which is incorporated by reference for all purposes.

FIELD OF THE INVENTION

The present invention relates generally to an arrangement of a rotor position sensor of an electric machine in a hybrid transmission housing. Moreover, the invention relates generally to a hybrid transmission housing that includes the arrangement of a rotor position sensor.

BACKGROUND

It is generally known from automotive engineering that a rotor position sensor is utilized in electric prime movers in hybrid transmissions to determine the position and the rotational speed of a rotor of the electric machine. Such input data is necessary for control of the electric machine. Eddy current sensors and variable reluctance (VR) resolver sensors, for example, can be utilized as a rotor position sensor, wherein eddy current sensors are preferred for cost-related reasons. The rotor position sensors can be designed, for example, as sensors scanning a sensor track on an axial side or as sensors scanning the sensor track on a radial side.

Regardless of whether an axially or radially scanning rotor position sensor is utilized, the arrangement of the rotor position sensor and the associated or corresponding sensor track in the hybrid transmission is structurally complex and costly, since, on the one hand, components are necessary on the housing side, to which the rotor position sensor is attached and, on the other hand, components are necessary on the torque-converter side, to which the concurrently-rotating sensor track is attached.

In addition, in the case of hybrid transmissions that include a torque converter, the problem arises that the torque converter expands in the longitudinal direction or on an axial side in the area of the torque converter hub during the operation of the automatic transmission due to the internal pressure, which is referred to as so-called torque converter ballooning. Accordingly, in the case of a scanning on an axial side, an appropriate axial tolerance compensation is to be taken into consideration.

SUMMARY OF THE INVENTION

Example aspects of the present invention provide an arrangement of a rotor position sensor as well as a hybrid transmission housing that includes the arrangement, which allow for a structurally simple and cost-effective arrangement of the rotor position sensor and the sensor track.

Accordingly, an arrangement of at least one sensor track-scanning rotor position sensor of an electric machine in a hybrid transmission housing includes a torque converter and a housing-affixed oil supply plate arrangement. In order to allow for a structurally simple and particularly cost-effective arrangement of the rotor position sensor and the corresponding sensor track, the rotor position sensor is attached on the oil-supply-plate side and a sensor ring, as a sensor track, is attached on the torque-converter side.

The particularly cost-effective and structurally simple arrangement is implemented by way of the arrangement of the rotor position sensor on the oil supply plate arrangement, while the sensor ring or the like, as a sensor track, is attached to the torque converter directly adjacent to the oil supply plate arrangement, in a particularly structurally simple way.

The attachment of the rotor position sensor to the oil supply plate arrangement can take place in various ways. For example, the oil supply plate arrangement can include a centering plate which is arranged on the converter side in the hybrid transmission housing and is attached to an intermediate plate, or the like, of the oil supply plate arrangement. In this type of oil supply plate arrangement, a particularly structurally simple attachment results by way of the fact that the rotor position sensor is integrated into the oil supply plate arrangement and is arranged, for example, between the centering plate and the intermediate plate.

Within the scope of a closest example refinement of the invention, depending on the application, the rotor position sensor can also be attached to the centering plate or to the intermediate plate when this is necessary, for example, due to installation situations.

In the case of the utilization of a rotor position sensor which radially scans the sensor track, no axial tolerance-compensating measures are necessary, due to the insensitivity to axial tolerance, and so the sensor ring, or the like, can be attached directly to the torque converter hub. Depending on where the rotor position sensor is attached to the oil supply plate arrangement, it may be advantageous when the sensor ring is attached to the converter hub with the aid of a connecting plate or the like, so that the sensor track faces the rotor position sensor on a radial side, so that a scanning of the sensor track by the rotor position sensor is ensured in a structurally simple way.

When an axially scanning rotor position sensor is utilized in the arrangement according to example aspects of the invention, with respect to the attachment of the sensor track, either an axial tolerance compensation is necessary or the sensor track is attached to a component which is independent of axial tolerance, such as to a converter shell of the torque converter. It is also conceivable, however, that the sensor track or the sensor ring is attached to other axial tolerance-independent components.

In the case of the utilization of an axially scanning rotor position sensor, various structural options are possible for attaching the sensor ring, or the like, to the torque converter, in order to implement an axial tolerance compensation. For example, components which are already present and which, for example, are mounted on a converter hub of the torque converter in an axially displaceable manner and are rotationally fixed thereto can be utilized. It is also possible that additional components, which are mounted on the converter hub of the torque converter in an axially displaceable manner and are rotationally fixed thereto, are also utilized for tolerance compensation.

One further example aspect of the present invention provides that a hybrid transmission housing includes the proposed arrangement. This yields the aforementioned advantages as well as further advantages.

BRIEF DESCRIPTION OF THE DRAWINGS

The present invention is explained in greater detail in the following with reference to the drawings. Wherein.

It should be noted that the hatching lines in the figures are to identify the views as being cross-sectional views. No material properties should be inferred from the style of the hatching lines shown in the figures.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1 to 6 show various arrangement variants, according to example aspects of the invention, of a sensor system 24 with a sensor track-scanning rotor position sensor 1, 1A of an electric machine EM in a hybrid transmission housing 2 including a torque converter 3 and a housing-affixed oil supply plate arrangement 22, by way of example.

Figure 1:
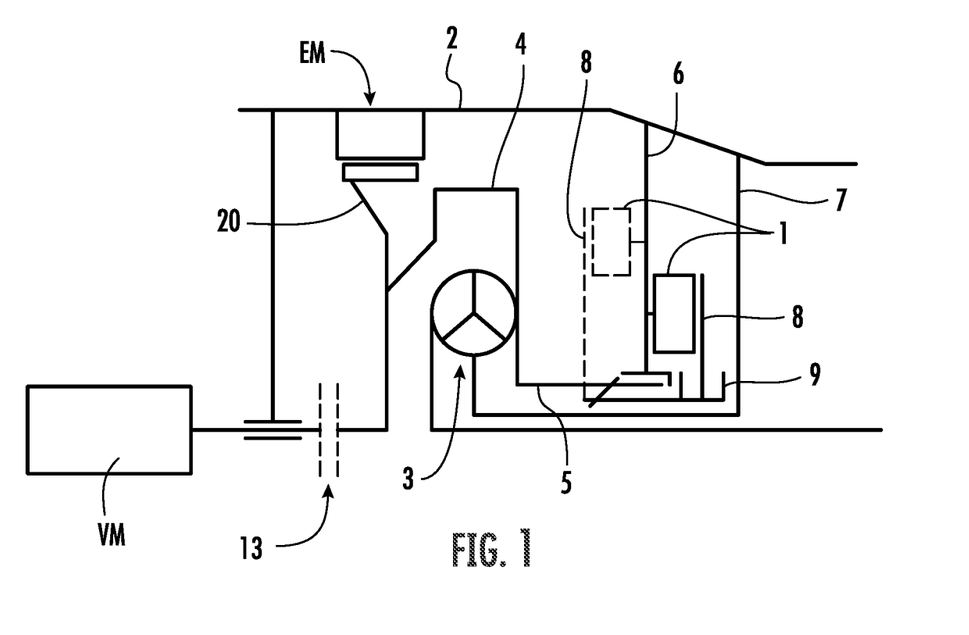
FIG. 1 shows a diagrammatic view of multiple exemplary embodiments of an arrangement, according to the invention, of a sensor track-scanning rotor position sensor of an electric machine in a hybrid transmission housing.

FIG. 1 shows a diagrammatic view of the hybrid transmission housing 2 including various possible arrangements of the rotor position sensor 1, 1 A. The various possible arrangements are indicated by a dashed line. In the hybrid transmission housing 2, the electric machine EM including the rotor 20 is represented. The rotor is rotationally fixed to a converter shell 4 of the torque converter 3 and, finally, to the converter hub 5. The input shaft of an internal combustion engine VM is connected to the torque converter 3 either directly or with the aid of a clutch 13 represented with the aid of dashed lines. The oil supply plate arrangement provided in the hybrid transmission housing 2 consists of a centering plate 6 arranged on the converter side and an intermediate plate 7, to which the centering plate 6 is attached.

Figure 2:
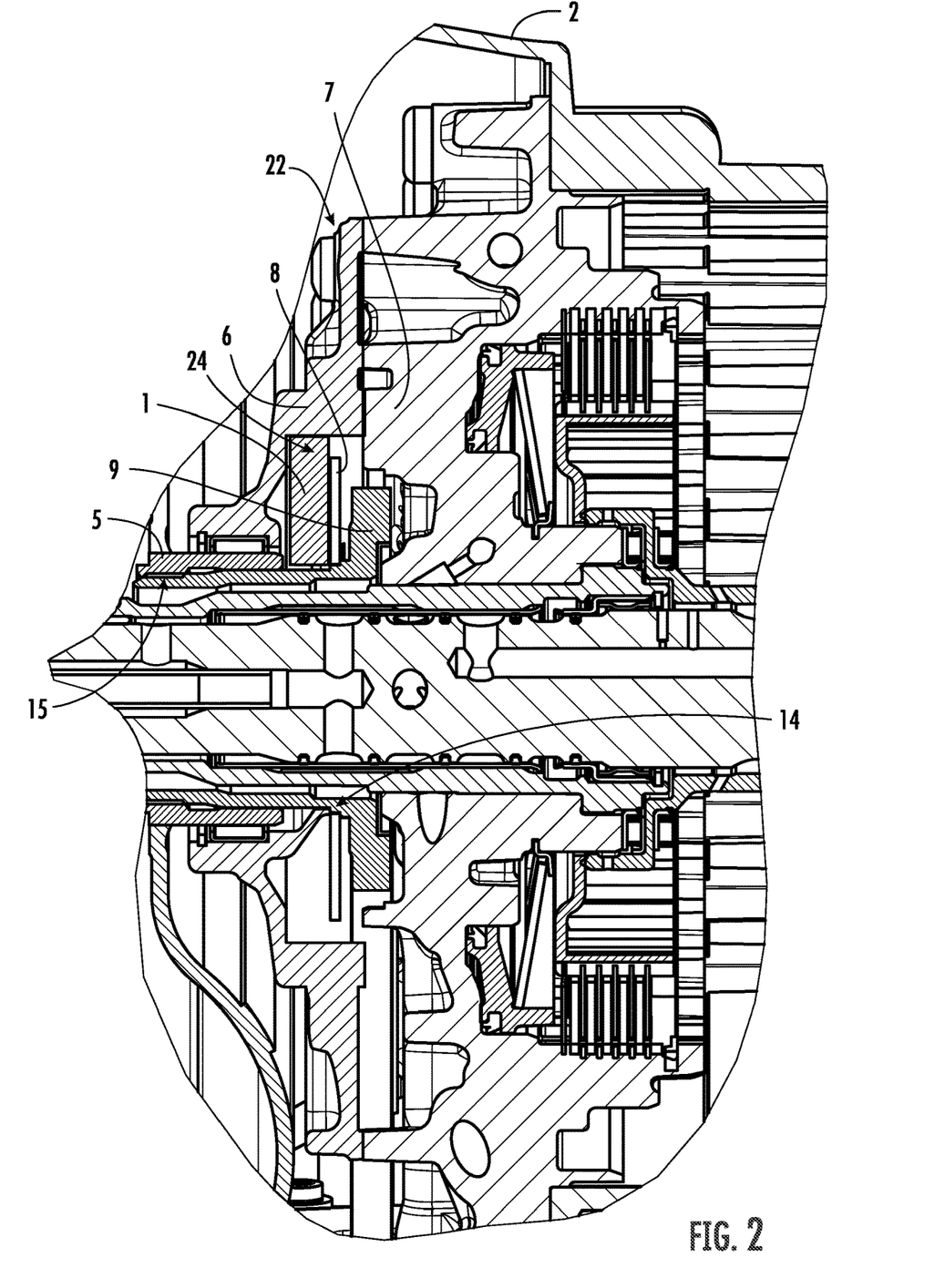
FIG. 2 shows a cut part view of the hybrid transmission housing including a first arrangement variant of the rotor position sensor scanning on an axial side, and the associated sensor track.

FIG. 2 shows a first possible arrangement of a rotor position sensor 1 scanning the sensor track on an axial side, and an associated sensor ring 8 as a sensor track. The rotor position sensor 1 is integrated into the oil supply plate arrangement, due to the fact that the rotor position sensor 1 is arranged between the centering plate 6 and the intermediate plate 7. In this embodiment, the rotor position sensor 1 is attached to the centering plate and is located in a recess formed between the centering plate 6 and the intermediate plate 7. The associated sensor ring 8 is attached to the converter hub 5 of the torque converter 3 with the aid of an axial tolerance-compensating component. An existing pump drive gear 9 is provided as an axial tolerance-compensating component, wherein the pump drive gear 9 is axially displaceably arranged radially inward on the converter hub 5 for axial tolerance compensation and is rotationally fixed to the converter hub 5. The pump drive gear is utilized for driving an oil pump for the oil supply in the hybrid transmission. Moreover, an axial stop 14 of the pump drive gear or of the sprocket is provided on the centering plate 6, wherein this stop 14 is present only in the segments in which the rotor position sensor 1 is not positioned. The pump drive gear 9 is connected to the converter hub 5 in an axial tolerance-compensating and rotationally fixed manner with the aid of sliding toothing or splines 15. As a result, it is ensured that the sensor ring 8 is axially positioned in the correct tolerance position with respect to the rotor position sensor 1. The sensor ring 8 has been pressed, welded, or peened onto the pump drive gear 9, or has been attached to the pump drive gear using other methods.

Figure 3:
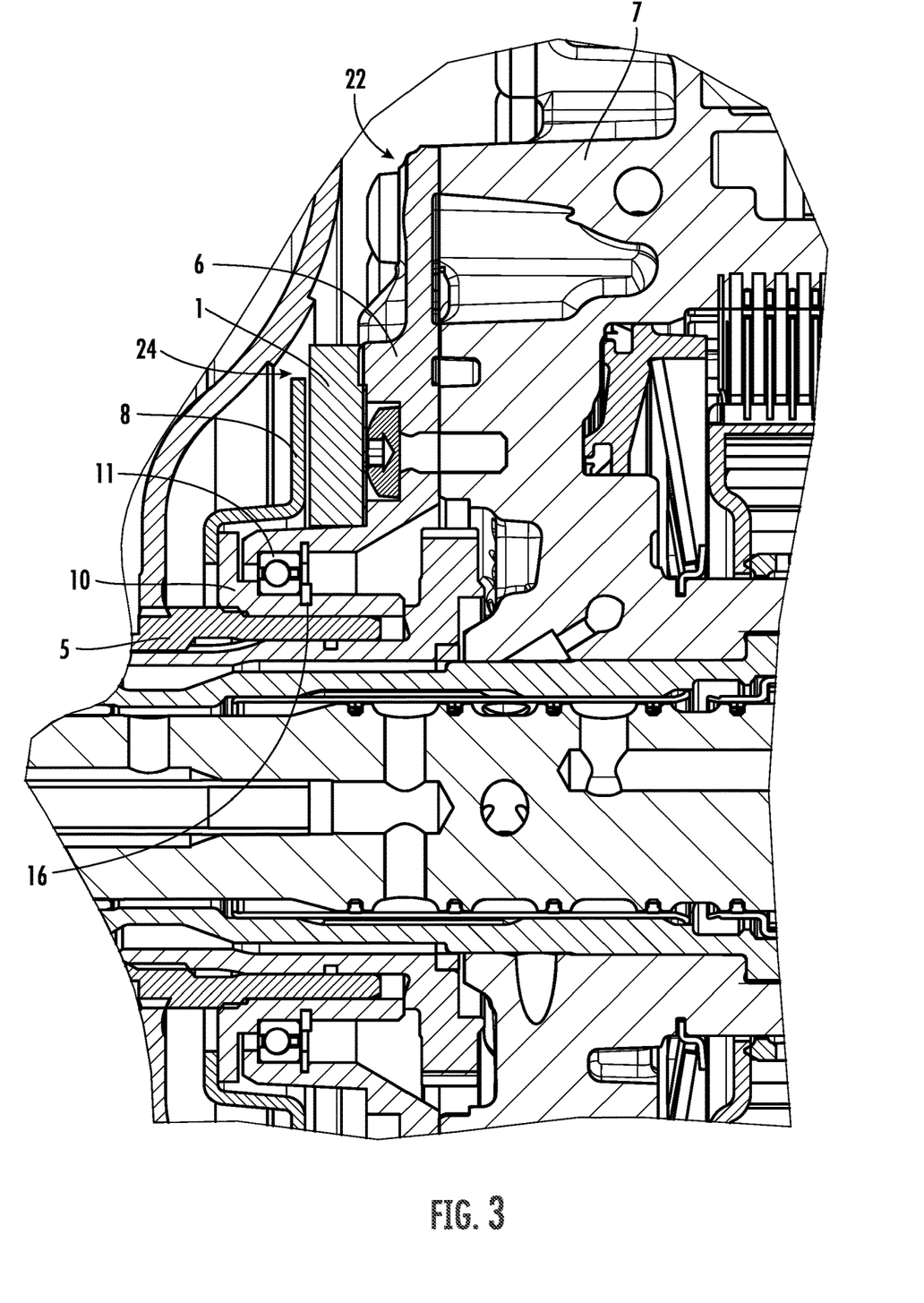
FIG. 3 shows a cut part view of the hybrid transmission housing including a second arrangement variant of the rotor position sensor scanning on an axial side, and the associated sensor track.

FIG. 3 shows a second possible arrangement of the rotor position sensor 1 scanning the sensor track on an axial side. In this second possible arrangement, the rotor position sensor 1 is arranged outwardly on the centering plate 6, i.e., on the side of the centering plate 6 facing away from the intermediate plate 7. In this second possible embodiment, a hub part 10 is provided as an axial tolerance-compensating component, wherein the hub part 10 is axially displaceably arranged radially inward, e.g., of the sensor ring 8, on the converter hub 5 of the torque converter 3 for axial tolerance compensation and is rotationally fixed to the converter hub 5. In addition, the hub part 10 is mounted radially outward on the oil supply plate arrangement with the aid of an axial bearing 11, wherein the axial bearing 11 is axially supported with the aid of at least one snap ring 16. The sensor ring 8 is connected to the hub part 10 with the aid of a wound metal sheet. Accordingly, the rotor position sensor 1 is mounted outwardly on the centering plate 6 in this second possible embodiment. The sensor ring 8 is mounted on the hub part 10 which is axially fixed in the centering plate 6 and on the converter hub 5 with the aid of the axial bearing 11. The axial displaceability and the rotationally fixed connection are implemented, by way of example, with the aid of sliding toothing or splines between the hub part 10 and the converter hub 5. In this possible arrangement, it is also conceivable to utilize a radially protruding rotor position sensor 1 A.

Figure 4:
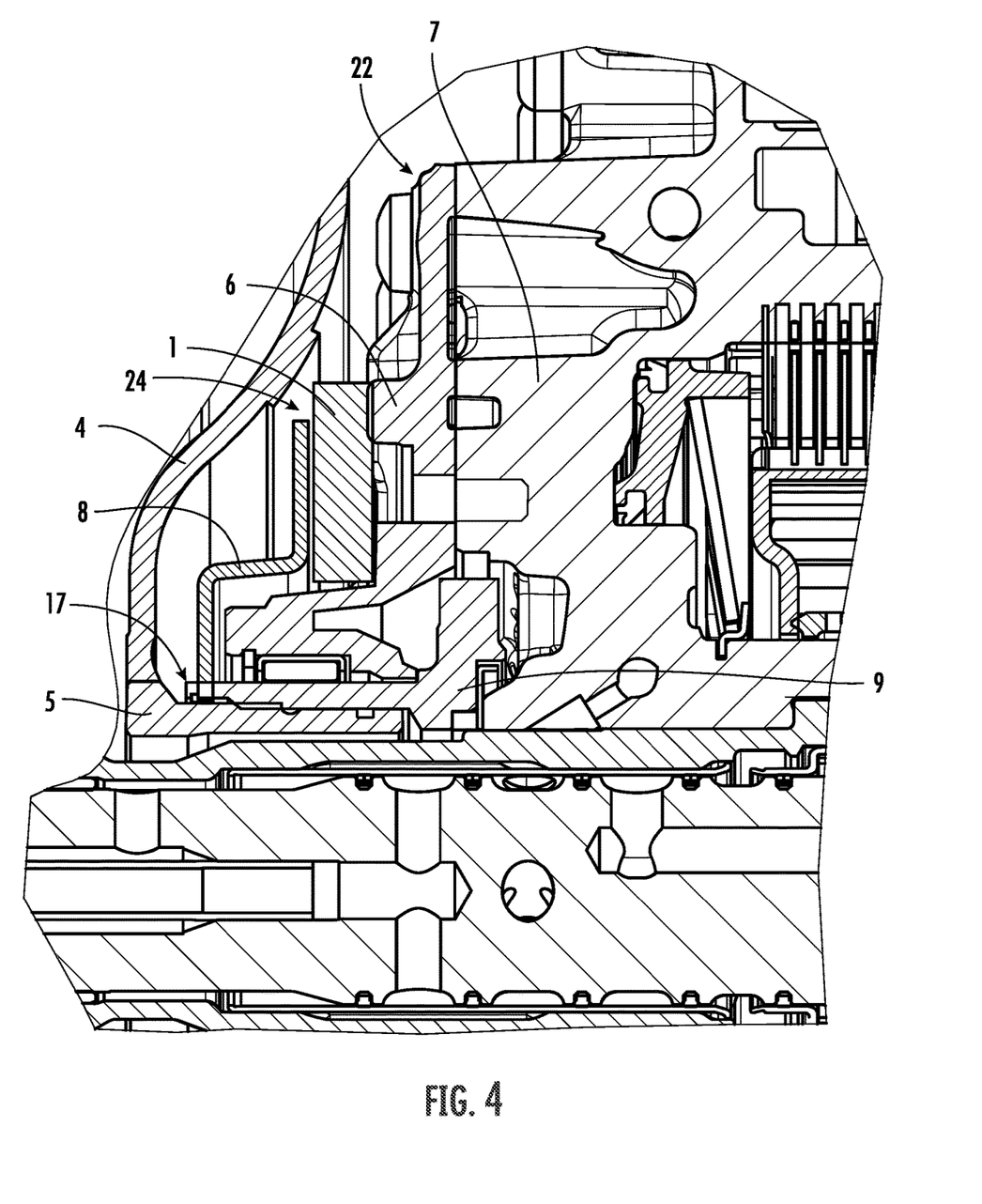
FIG. 4 shows a cut part view of the hybrid transmission housing including a third arrangement variant of the rotor position sensor scanning on an axial side, and the associated sensor track.

FIG. 4 shows a third possible arrangement of the rotor position sensor 1 scanning on an axial side. The rotor position sensor 1 is attached outwardly to the centering plate 6 as in the second possible arrangement. The sensor ring 8 is attached to the pump drive gear 9 as in the first possible arrangement. In contrast to the first possible arrangement, the pump drive gear 9 is axially displaceably arranged radially outward on the converter hub 5 of the torque converter 3 for axial tolerance compensation and is rotationally fixed to the converter hub 5. In this third arrangement variant, the arrangement of the pump drive gear 9 and the torque converter impeller hub are radially interchanged relative to the first arrangement variant. The sensor ring or the sensor wheel 8 must be fixed and secured after the installation of the sprocket or the pump drive gear 9. For example, the sensor ring 8 can be placed onto the pump drive gear 9 with the aid of a crown gearing 17 or the like and can be secured inwardly with the aid of a snap ring. Subsequent thereto, the torque converter 3 is inserted inwardly into a hub.

Figure 5:
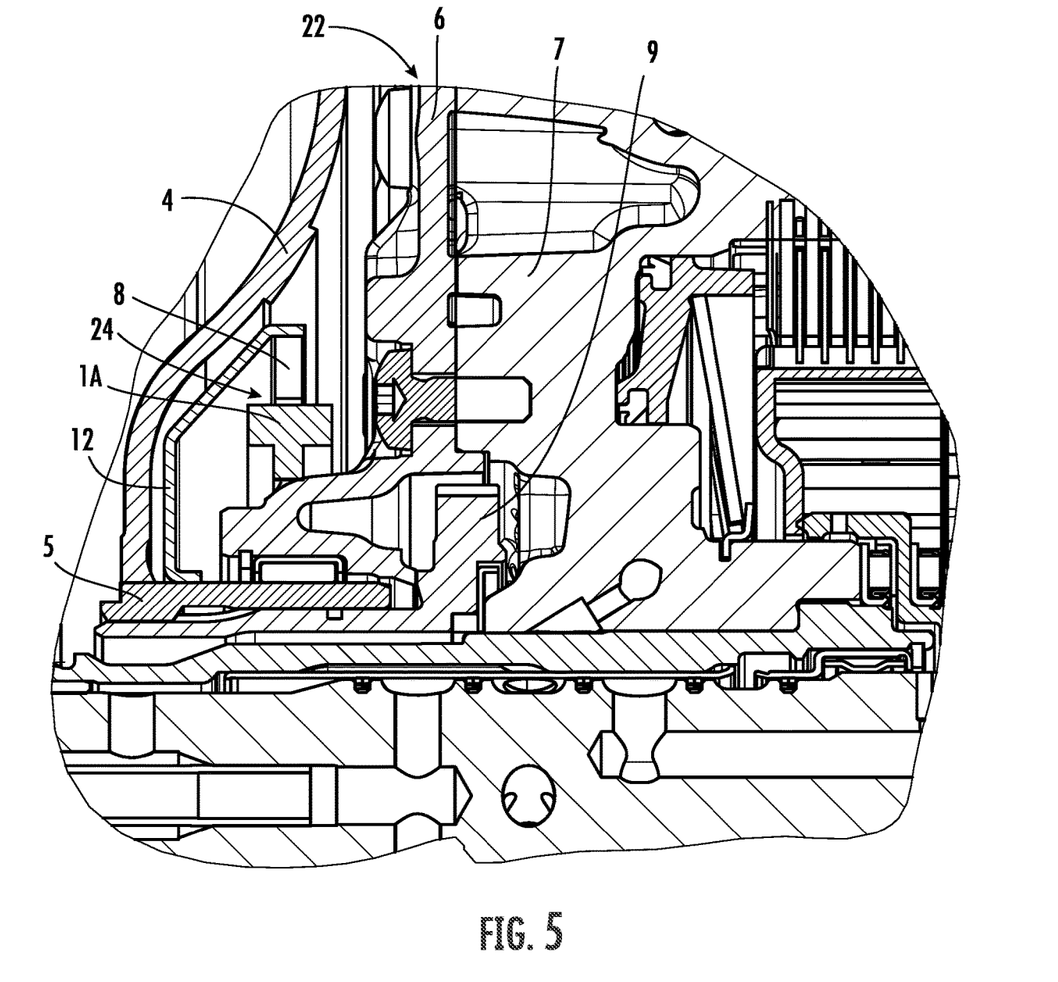
FIG. 5 shows a cut part view of the hybrid transmission housing including a fourth arrangement variant of a rotor position sensor scanning on a radial side, and the associated sensor track.

FIG. 5 shows a fourth possible arrangement including a radially protruding rotor position sensor 1 A, by way of example. The rotor position sensor 1 A is outwardly attached to the centering plate 6. Since the radially scanning rotor position sensor 1 A is insensitive to axial tolerance, it is possible in this fourth arrangement variant to attach the sensor ring 8 directly to the converter hub 5 of the torque converter 3 without tolerance compensation. In this fourth possible arrangement, the sensor ring 8 is attached to the converter hub 5 with the aid of a connecting plate 12 in such a way that the sensor track faces the rotor position sensor 1 A on the radial side. A VR resolver is utilized as the rotor position sensor 1 A.

Figure 6:
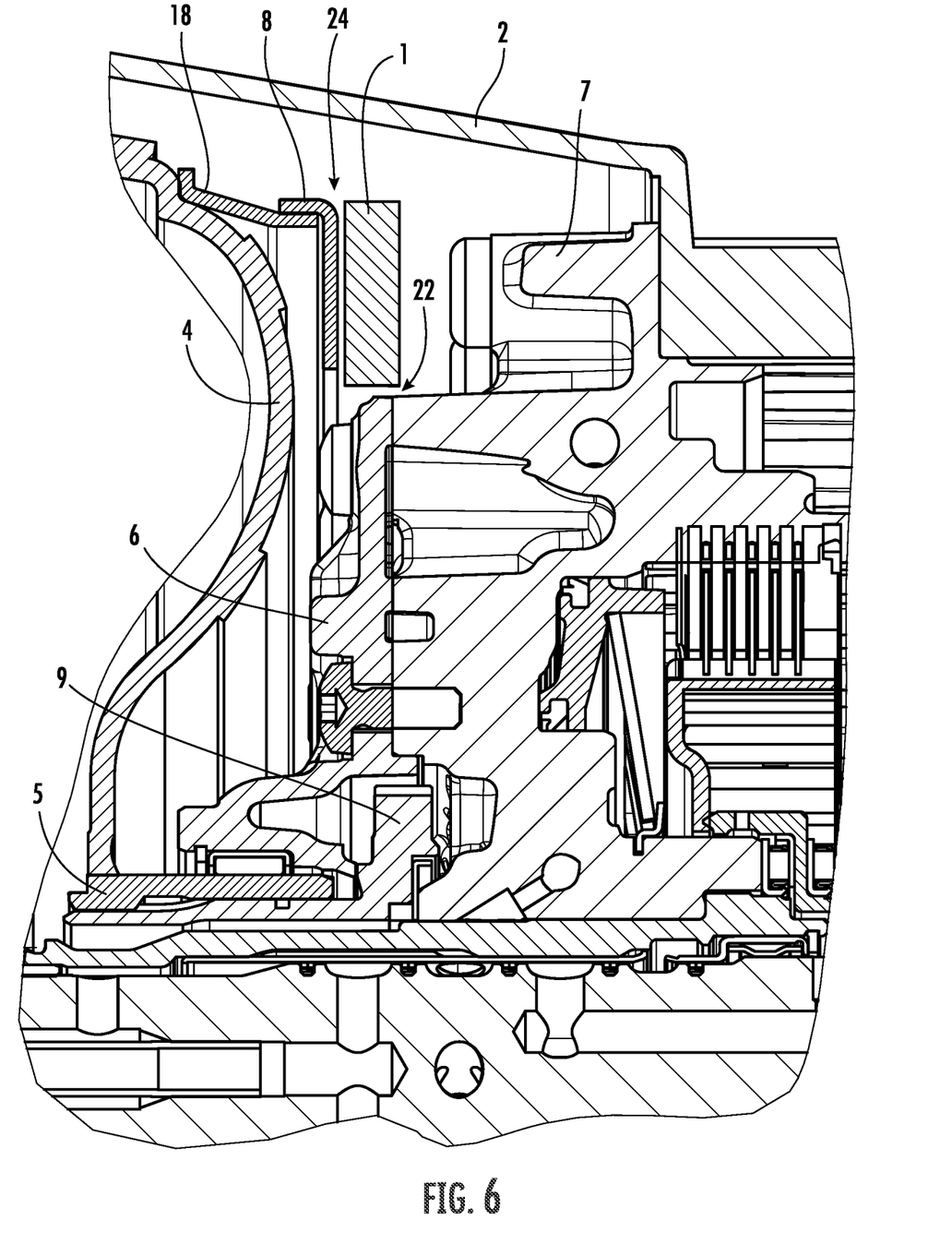
FIG. 6 shows a cut view of the hybrid transmission housing including a fifth arrangement variant of the rotor position sensor scanning on an axial side, and the associated sensor track.

FIG. 6 shows a fifth possible arrangement of the rotor position sensor 1 scanning on an axial side, by way of example. In this fifth embodiment variant, the rotor position sensor 1 is arranged on the intermediate plate 7 on the outer area, as viewed radially. The sensor ring 8 is attached to an axial tolerance-independent converter shell 4 of the torque converter 3. Since the converter shell 4 is provided on the outer diameter of the torque converter 3 and the axial expansion effect is low in this area, a small lever arm results, and so a tolerance compensation in the axial direction is not necessary. When the sensor ring 8 has been made of a non-ferromagnetic material, it is possible to utilize an appropriate connecting plate 18 which is welded, or the like, onto the torque converter or onto the converter shell 4, wherein a connection between the sensor ring 8 and the connecting plate 18 is provided, for example, with the aid of riveting, shaping, or the like.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 rotor position sensor scanning on an axial side
1 A rotor position sensor scanning on a radial side
2 hybrid transmission housing
3 torque converter
4 converter shell
5 converter hub
6 centering plate
7 intermediate plate
8 sensor ring
9 pump drive gear
10 hub part
11 axial bearing
12 connecting plate
13 clutch
14 axial stop
15 sliding toothing
16 snap ring
17 crown gearing
18 connecting plate
20 rotor
EM electric machine
VM internal combustion engine

The invention claimed is:

1. A sensor system in a hybrid transmission housing (2) that includes a torque converter (3) and a housing-affixed oil supply plate arrangement, comprising:
   at least one sensor track-scanning rotor position sensor (1, 1 A) attached to the oil supply plate arrangement such that the at least one sensor track-scanning rotor position sensor (1, 1 A) is rotationally fixed on the oil supply plate arrangement; and
   a sensor ring (8) configured as a sensor track, the sensor ring (8) attached to the torque converter (3) such that the sensor ring (8) is coupled to the torque converter (3).

2. The sensor system of claim 1, wherein the rotor position sensor (1, 1 A) is configured for radially scanning the sensor track, and the sensor ring (8) is attached to a converter hub (5) of the torque converter (3).

3. The sensor system of claim 2, wherein the sensor ring (8) is attached to the converter hub (5) with a connecting plate (12) such that the sensor track radially faces the rotor position sensor (1, 1 A).

4. The sensor system of claim 1, wherein the rotor position sensor (1, 1 A) is configured for axially scanning the sensor track.

5. The sensor system of claim 4, wherein the sensor ring (8) is attached to an axial tolerance-independent converter shell (4) of the torque converter (3).

6. The sensor system of claim 4, wherein the sensor ring (8) is attached to a converter hub (5) of the torque converter (3) with an axial tolerance-compensating component.

7. The sensor system of claim 6, wherein:
   a pump drive gear (9) is the axial tolerance-compensating component;
   the pump drive gear (9) is configured for axial displacement and is arranged radially inward or radially outward on the converter hub (5) of the torque converter (3) for axial tolerance compensation; and
   the pump drive gear (9) is rotationally fixed to the converter hub (5).

8. The sensor system of claim 6, wherein:
   a hub part (10) is the axial tolerance-compensating component;
   the hub part (10) is configured for axial displacement and is arranged radially inward on the converter hub (5) of the torque converter (3) for axial tolerance compensation;
   the hub part (10) is rotationally fixed to the converter hub (5); and
   the hub part (10) is mounted radially outward on the oil supply plate arrangement with an axial bearing (11).

9. A hybrid transmission housing (2) comprising the sensor system of claim 1.

10. A sensor system in a hybrid transmission housing (2) that includes a torque converter (3) and a housing-affixed oil supply plate arrangement, comprising:
    at least one sensor track-scanning rotor position sensor (1, 1 A) attached to the oil supply plate arrangement; and
    a sensor ring (8) configured as a sensor track, the sensor ring (8) attached to the torque converter (3),
    wherein the oil supply plate arrangement comprises a centering plate (6) and an intermediate plate (7), the centering plate (6) arranged on a torque converter side in the hybrid transmission housing (2), the centering plate (6) connected to the intermediate plate (7), and wherein the rotor position sensor (1, 1A) is integrated into the oil supply plate arrangement and is arranged between the centering plate (6) and the intermediate plate (7).

11. A sensor system in a hybrid transmission housing (2) that includes a torque converter (3) and a housing-affixed oil supply plate arrangement, comprising:

at least one sensor track-scanning rotor position sensor (1, 1A) attached to the oil supply plate arrangement; and a sensor ring (8) configured as a sensor track, the sensor ring (8) attached to the torque converter (3), wherein the oil supply plate arrangement comprises a centering plate (6) and an intermediate plate (7), the centering plate (6) arranged on a torque converter side in the hybrid transmission housing (2), the centering plate (6) connected to the intermediate plate (7), and wherein the rotor position sensor (1, 1A) is attached to the centering plate (6).

12. A sensor system in a hybrid transmission housing (2) that includes a torque converter (3) and a housing-affixed oil supply plate arrangement, comprising:

at least one sensor track-scanning rotor position sensor (1, 1A) attached to the oil supply plate arrangement; and a sensor ring (8) configured as a sensor track, the sensor ring (8) attached to the torque converter (3), wherein the oil supply plate arrangement comprises a centering plate (6) and an intermediate plate (7), the centering plate (6) arranged on a torque converter side in the hybrid transmission housing (2), the centering plate (6) connected to the intermediate plate (7), and wherein the rotor position sensor (1, 1A) is attached to the intermediate plate (7).

* * * * *